US007827081B2

(12) United States Patent
Sinha et al.

(10) Patent No.: US 7,827,081 B2
(45) Date of Patent: Nov. 2, 2010

(54) COMPUTER METHOD AND SYSTEM FOR EQUITY FINANCING BY RETAIL INVESTORS WITH COLLECTIVE DUE DILIGENCE FUNDING

(75) Inventors: Vaibhav Sinha, Noida (IN); Misam Abbas, Noida (IN); Sumit Yadav, Arlington, MA (US)

(73) Assignee: PhiStream, Inc., Vancouver, British Columbia ( * ) Notice: Subject to any disclaimer, the term of this patent is extended or adjusted under 35 U.S.C. 154(b) by 519 days.

(21) Appl. No.: 11/696,522

(22) Filed: Apr. 4, 2007

(65) Prior Publication Data
US 2008/0249953 A1 Oct. 9, 2008

(51) Int. Cl.
*G06Q 40/00* (2006.01)
(52) U.S. Cl. .................................................... 705/35
(58) Field of Classification Search ............. 705/35, 705/36 R, 37
See application file for complete search history.

(56) References Cited

U.S. PATENT DOCUMENTS

| | | | |
|---|---|---|---|
| 6,236,972 B1 | 5/2001 | Shkedy | |
| 7,509,274 B2 * | 3/2009 | Kam et al. | 705/35 |
| 7,647,273 B1 * | 1/2010 | Hill et al. | 705/38 |
| 2001/0034692 A1 | 10/2001 | McRedmond | |
| 2002/0023033 A1 | 2/2002 | Campbell et al. | |
| 2002/0138385 A1 * | 9/2002 | Milam | 705/36 |
| 2003/0101115 A1 * | 5/2003 | Reddy | 705/35 |
| 2003/0216932 A1 | 11/2003 | Foley | |
| 2005/0197857 A1 | 9/2005 | Avery | |
| 2007/0185817 A1 * | 8/2007 | Davis | 705/51 |
| 2008/0082383 A1 * | 4/2008 | Hollas | 705/7 |
| 2008/0086352 A1 * | 4/2008 | Hibbert et al. | 705/8 |
| 2008/0195555 A1 * | 8/2008 | Carr | 705/36 R |
| 2008/0215474 A1 * | 9/2008 | Graham | 705/37 |
| 2010/0106634 A1 * | 4/2010 | Atureliya | 705/35 |

FOREIGN PATENT DOCUMENTS

WO  WO 01/26063 A2  4/2001

OTHER PUBLICATIONS

Tebbit v Tebbit in battle for Sears:[2W Edition]Sarah Cunningham. The Times. London (UK):Dec. 16, 1998. p. 23.*
Simon Admits Patron Offer and Defends Director's pay, Alistair Osborn City Correspondent, The Daily Telegraph, London Mar. 7, 2001, p. 33.*

(Continued)

*Primary Examiner*—Alexander Kalinowski
*Assistant Examiner*—Bruce I Ebersman
(74) *Attorney, Agent, or Firm*—Hamilton, Brook, Smith & Reynolds, PC (57) ABSTRACT

The present invention provides a business facilitation system enabling retail investors to acquire equity in business entities that are seeking equity financing. The fund seeker electronically posts a proposal seeking funds. Through electronic communication means investors commit to buying the private equity at the rate fixed or indicate interest in getting due diligence conducted. If the funds sought are not met by unconditional commitments then investors who had indicated interest in due diligence can make conditional commitments based on the results of the due diligence for which they are willing to pool in funds. If a certain percentage of the funds sought are committed or met though conditional commitments whose conditions are satisfied within a fixed time period, then the fund seeker honors the proposal. Otherwise the fund seeker can revise, extend, honor or withdraw the proposal.

22 Claims, 6 Drawing Sheets

OTHER PUBLICATIONS

Got Collaboration? Electronic Document Networks Hold Great Promise for the Mortgage Industry, Phillips Judson, Mortgage Banking, Apr. 2007 9 pages.*

Stantec Signs Letter of Intent to Acquire New England, New York and Florida based Dufresne- Henry, Businesswire, Feb. 15, 2006, 4 pages.*

Greco, Susan, "The Real Legacy of Spring Street Brewing," Inc. Magazine: 4 pages Sep. 1999: http://www.inc.com/magazine/19990901/13720_Printer_Friendly.html.

International Search Report for PCT/US08/04407, date of mailing Nov. 3, 2008.

* cited by examiner

COMPUTER METHOD AND SYSTEM FOR EQUITY FINANCING BY RETAIL INVESTORS WITH COLLECTIVE DUE DILIGENCE FUNDING

BACKGROUND OF THE INVENTION

A business entity may not always find it feasible to raise the funds from a single source or a few sources with large contributions. This may lead the business entity to seek high interest loans or other channels while it would have preferred to raise funds through equity financing. Similarly there are individuals who are willing to invest in high risk, high gain private equity but this channel is not available to them as private equity investment usually demands a large amount of funds from a single source.

The most significant road block to private equity investments by retail investors is the cost associated with conducting due diligence on the business entity seeking funds. A retail investor may not be planning to invest an amount large enough for it to be feasible to individually finance due diligence on the business entity. Also, the investors may not want to invest in a business proposal for which no due diligence has been conducted.

These and other problems with equity financing exist unaddressed or illaddressed in the industry.

SUMMARY OF THE INVENTION

The present invention addresses the shortcomings of the prior art. In particular, the present invention provides a business facilitation system which enables private business entities and groups of retail investors to come together and arrive at a mutually beneficial agreement. In that agreement funds are transferred from the retail investors to the subject business entity and a percentage of the equity of the subject business entity is transferred to the retail investors.

The invention system and method enables retail investors to pool their resources to finance the conducting of due diligence on the subject company by a third party agency that has expertise in conducting due diligence. For this purpose due diligence agencies are registered with the invention business facilitation system and advertise their services and indicative rates.

In a preferred embodiment, a computer method and system publish a business proposal by a subject entity (or multiple such business proposals by respective entities). Each published business proposal includes an indication of amount of requested funds and is viewable by multiple investors. In some embodiments, the system provides alternative or different views with respective levels of detail corresponding to restricted view levels. The computer method and system employs investor reply means and collects commitments from investors. The commitments include conditional commitments. Next a fund-equity transfer engine determines whether a total of collected commitments meets a percentage of the amount of requested funds. If the total collected commitments satisfy this percentage, the fund-equity transfer engine processes a transfer of investor funds and subject entity equity accordingly. The percentage may be definable by the subject entity.

The conditional commitments include amounts of funds committed by an investor conditioned on (i) a due diligence being conducted by a certain third party (due diligence agency), (ii) the due diligence resulting in a rating meeting an investor defined threshold, and/or (iii) an investor specified percentage of the equity being committed to by other investors.

In accordance with another feature of the present invention, the fund-equity transfer engine allows the subject entity to withdraw the business proposal if the percentage of amount of funds requested is not met by the total collected investor commitments.

The subject entity equity may be any combination of business equity, commercial paper and real property of the subject entity. These and other features of the present invention are described more fully below.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention provides a business facilitation system 100 which enables private business entities and groups of retail investors to come together and arrive at a mutually beneficial agreement. In that agreement funds are transferred from the retail investors to the subject business entity and a percentage of the equity of the subject business entity is transferred to the retail investors.

The business entity may not always find it feasible to raise the funds from a single source or a few sources with large contributions. This may lead the business entity to seek high interest loans or other channels while it would have preferred to raise funds through equity financing. Similarly there are individuals who are willing to invest in high risk, high gain private equity but this channel is not available to them as private equity investment usually demands a large amount of funds from a single source.

The most significant road block to private equity investments by retail investors is the cost associated with conducting due diligence on the business entity seeking funds. A retail investor may not be planning to invest an amount large enough for it to be feasible to individually finance due diligence on the business entity. Also, the investors may not want to invest in a business proposal for which no due diligence has been conducted. The invention and system method 100 enables retail investors to pool their resources to finance the conducting of due diligence on the subject company by a third party agency that has expertise in conducting due diligence. For this purpose due diligence agencies are registered with the invention business facilitation system and advertise their services and indicative rates.

The process 100 starts with a subject business entity publishing a business proposal. Then the retail investors can either give an unconditional commitment or express interest in getting due diligence conducted on the business proposal. Investors may interact with, browse or otherwise communicate (place bids) in the process 100 by mobile phone, handheld personal devices (PDA's), Blackberry-type devices and other hand portable processor devices.

If the initial time for the business proposal has expired and the funds unconditionally committed are less than the funds sought, then the process 100 enters the next phase. In this phase bids are invited from due diligence agencies offering to conduct the due diligence. These bids are then put before interested investors. The investors then make a conditional commitment. They indicate that they are committed to invest respective certain amounts of funds in the business proposal provided the due diligence gets conducted by a particular due diligence agency and the resulting rating assigned is greater than or equal to a certain level. The investors can make such a conditional commitment for more than one bid put up by the agencies. The investors can also make multiple conditional commitments for the same bid saying, for example, that they will invest a certain amount if the rating assigned is greater than a certain level and another (greater) amount if the rating is greater than another level. The process 100 tries to achieve the best fit. Additionally, the investors specify the maximum amount they are willing to contribute individually to get the due diligence conducted.

The process of matching the bids for due diligence with the individual contributions indicated by the investors for the due diligence is continued until the predefined time period expires.

After the due diligence is conducted the conditionally committed funds get converted into committed funds if the condition that was specified by the investor is met. Committed funds are then pooled in and the resulting sum is checked with respect to the initial proposal (amount of funds requested). If the total is greater than or equal to a certain percentage of the funds sought by the subject business entity, then the deal goes though and a fund/equity transfer is processed (occurs). Common means and methods are used to make (implement) the fund/equity transfer.

The process 100 can be modified by redefining the condition (i.e., the rating assigned by the due diligence company) in the conditional commitment. Another possible condition may be that an investor specifies that he or she commits funds on the condition that a specified percentage of the requested funds (and hence equity) is committed to by other investors.

Honoring the business proposal whether mandatory or voluntary from the point of view of the subject business entity means divesting equity at the rate advertised in the business proposal to the retail investors who have committed funds. An important aspect of the invention is the option given to the fund seeking business entity to withdraw the proposal if a certain percentage of the funds sought are not committed collectively by the investors. This is useful because the fund seeker may be seeking funds to fulfill a particular objective which may not materialize if a certain amount is not raised through the above process 100. In this case the fund seeker may not want to part with the equity and would like to withdraw the original proposal.

The owner of the system 100 (on which the said invention process 100 executes) can charge the business entities for listing their proposals on the basis of how long the listing is advertised on the system. An additional charge can be placed per transaction where one transaction is understood to be a successful execution of funds and equity exchange between one investor and one business entity.

Figure 1:
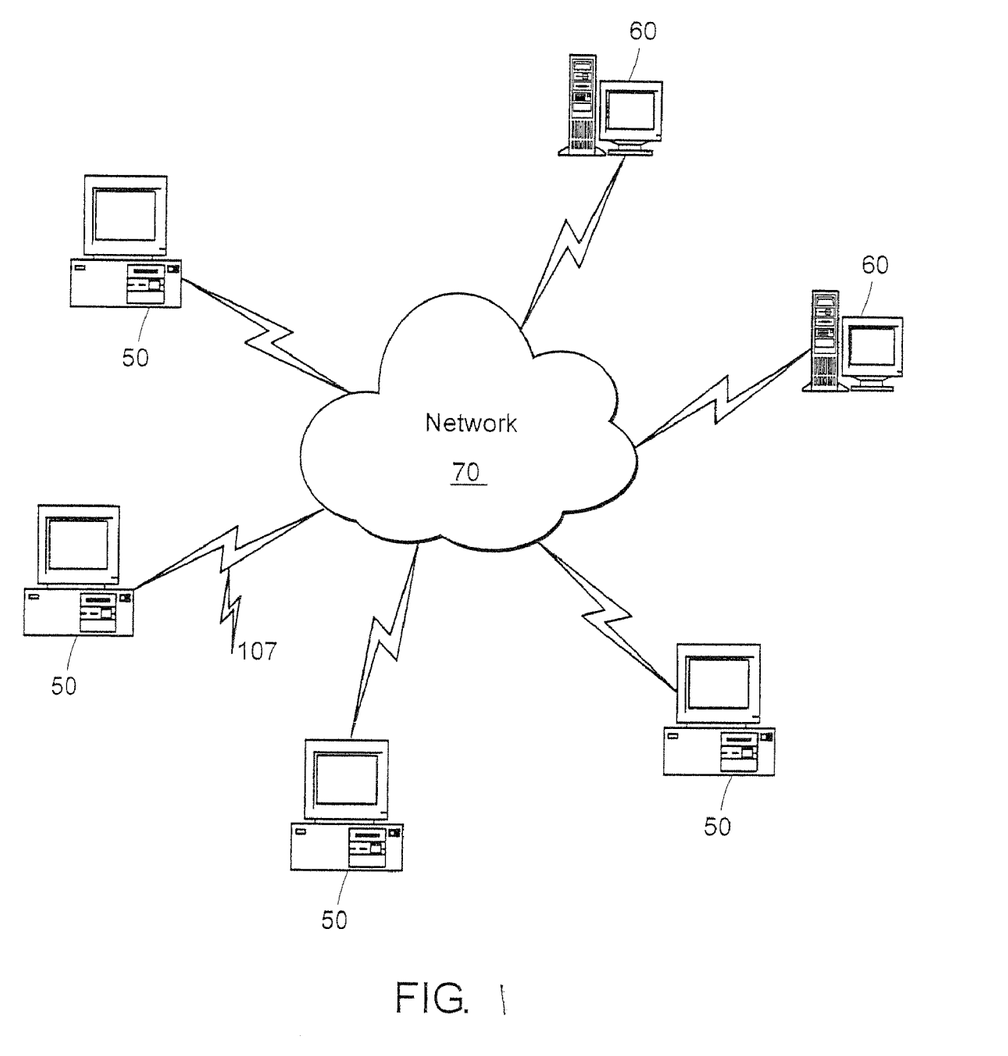
FIG. 1 is a schematic view of a computer network environment in which embodiments of the present invention may be implemented.

FIG. 1 illustrates a computer network or similar digital processing environment in which the present invention system 100 may be implemented.

Client computer(s)/devices 50 and server computer(s) 60 provide processing, storage, and input/output devices executing application programs and the like. Client devices 50 may include handheld processing devices such as mobile phones, PDA's (personal data assistants), Blackberry-type devices, and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
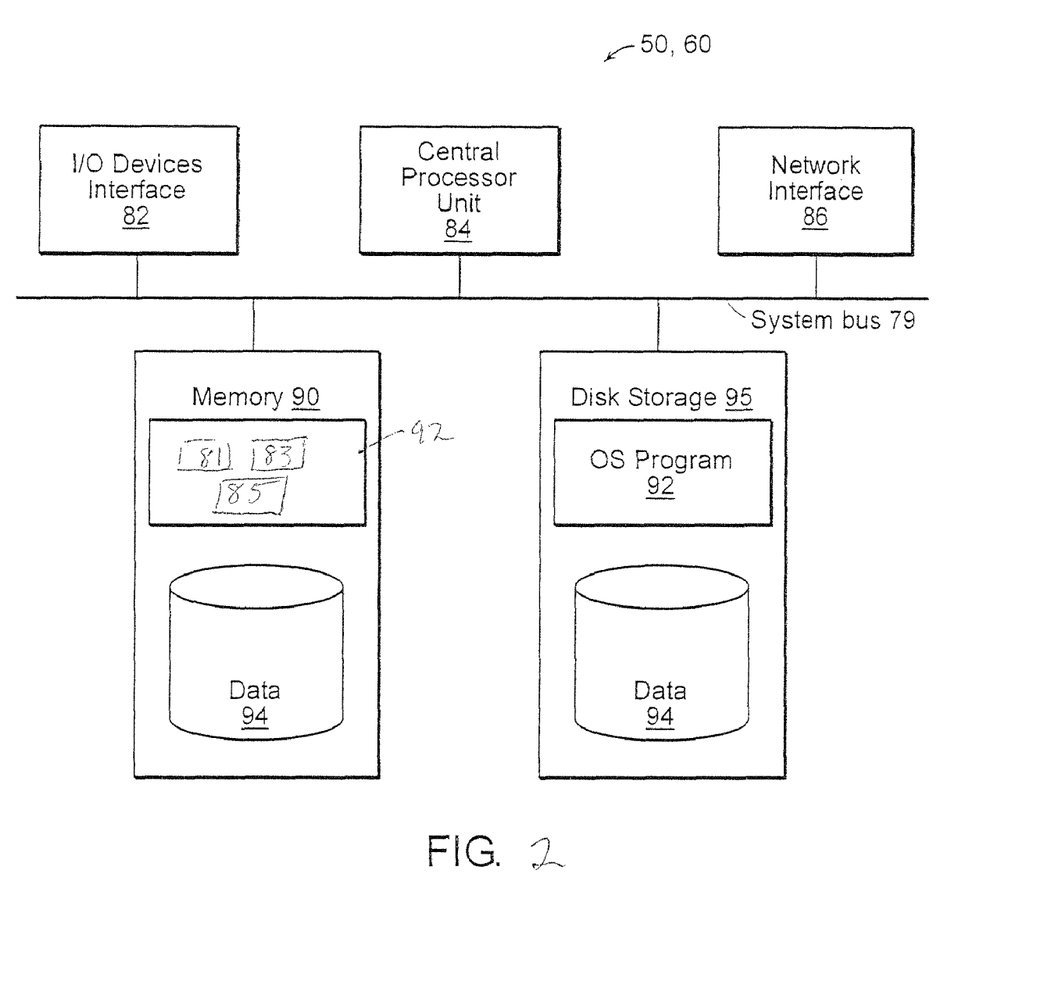
FIG. 2 is a block diagram of a computer node or device in the network of FIG. 1.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., including business proposal publication module 81, due diligence bids, and investor commitments (investor reply module 83), and fund-equity transfer engine 85 detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In a preferred embodiment, the invention system/process 100 for equity financing and collective due diligence funding is configured as a portal or node 60 in a global computer network 70 such as the Internet. Through client devices 50, end users access the invention portal 60 configured to operatively provide process 100. The end users include investors, due diligence agencies, fund seeking business entities and the like.

Figure 3A:
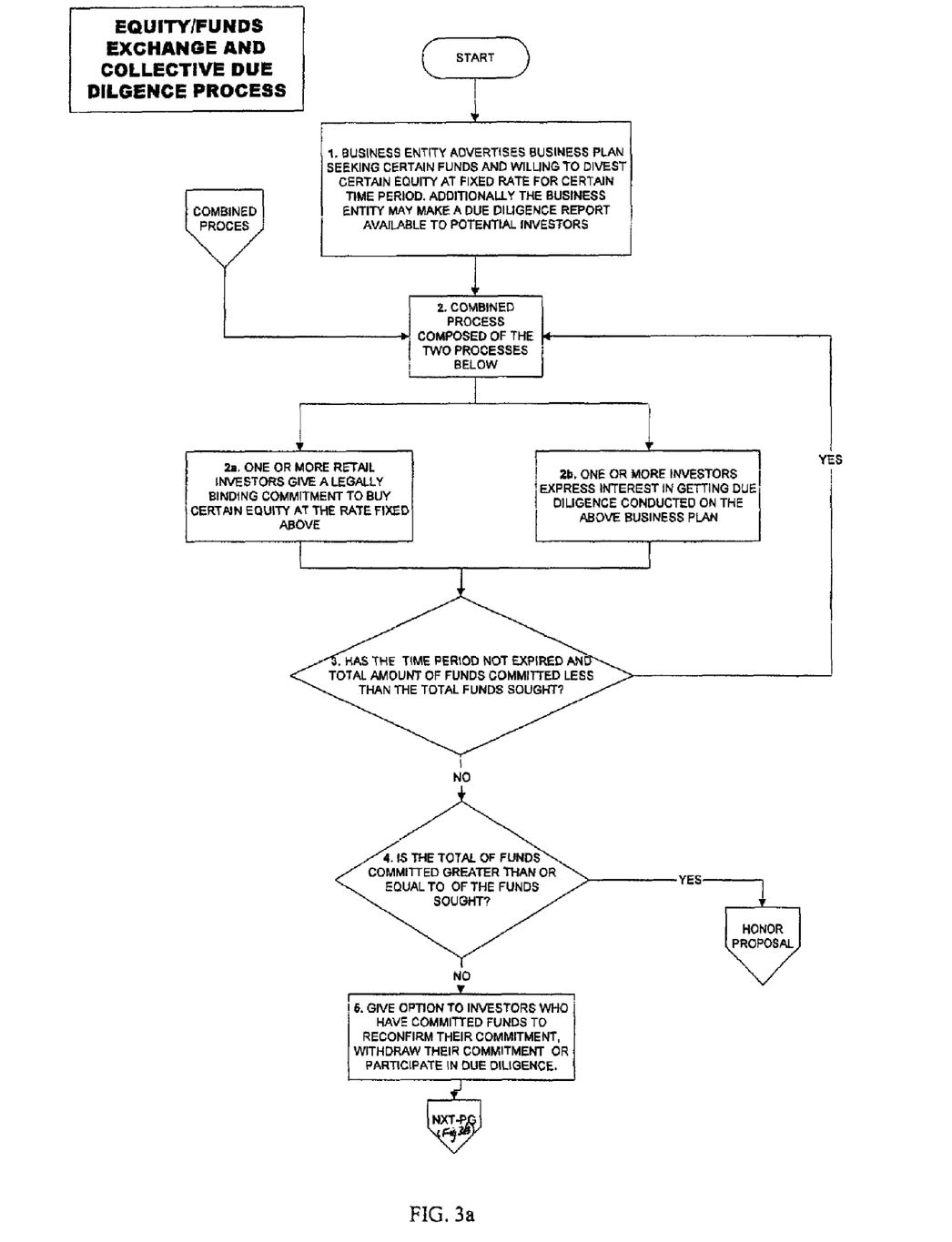
FIGS. 3a-3c are flow diagrams of an equity/funds exchange and collective due diligence in one embodiment of the present invention.
Figure 3B:
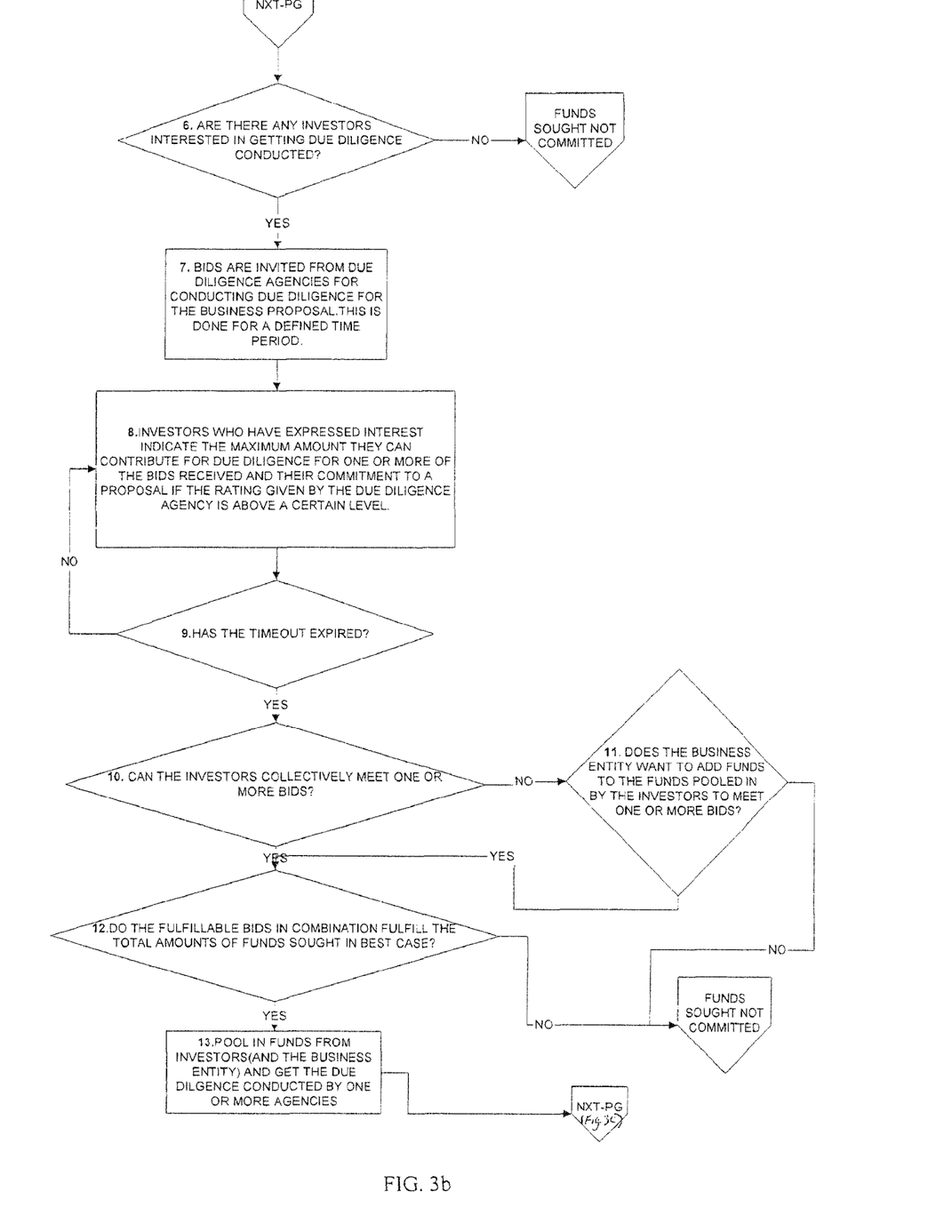
Figure 3C:
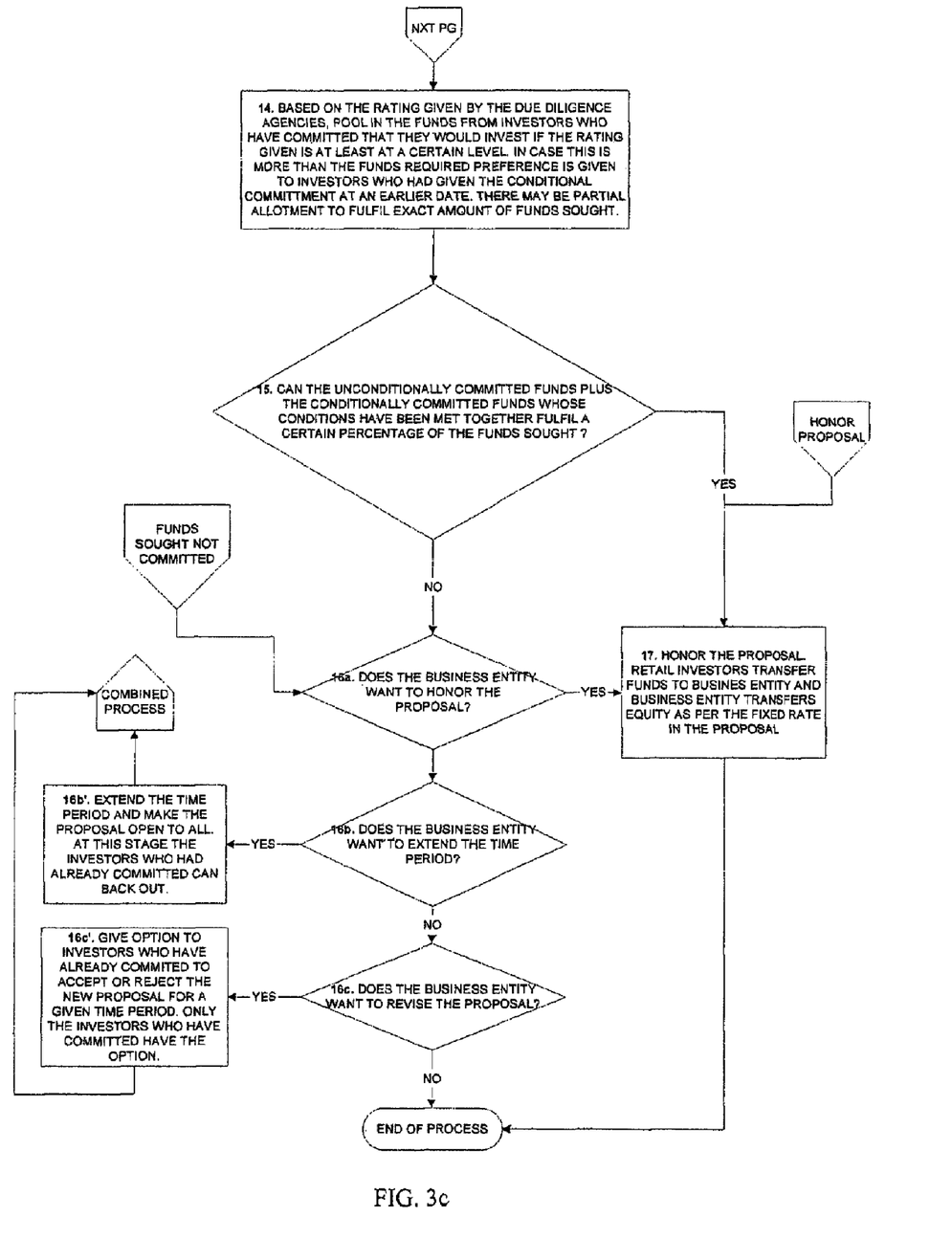

FIGS. 3a-3c are illustrative of program instructions/routine 92 and data 94 of one embodiment of system 100. In step 1, the subject business entity publishes a formal business proposal specifying the conditions under which it is willing to divest its equity. The business entity specifies the percentage of equity that it is willing to divest and the cost per unit of equity. For example the business entity could be willing to divest 10% of its equity and seeking $100,000. The $100,000 could be divided into 10,000 shares prices at $10 each. The minimum number of shares and incremental number of shares that can be committed will also be specified. So a business proposal could look like:

| Field Description | Value |
|---|---|
| Business Proposal Title | Restaurant in Chicago, seek funds for expansion |
| Proposal Description | We are opening a new outlet in a new location and the funds will be used for infrastructure setup to make the new outlet operational |
| Funds Sought | $100,000 |
| Equity to be divested | 10% |
| Number of Shares | 10,000 |
| Minimum number of shares that can be committed by an individual | 50 |
| Shares above minimum can be committed in multiples of | 10 |
| Time period for which the proposal is open | 30 days |
| Due Diligence Conducted | Yes |
| Due Diligence Conducted By | XYZ DD Agency |
| Due Diligence Rating | 8 |

Step 1 is accomplished through business proposal module 81 for example.

Continuing with FIG. 3a, in step 2, once the business proposal is published interested investors can take two possible actions on the business proposal a. (shown at step 2a) Make a binding commitment for a certain number of shares subject to the minimum and incremental number of shares allowed by the business proposal. There can be various ways of making this commitment which include but are not limited to the following:
  i. Investors Sign a letter of intent committing certain funds.
  ii. Investors allow a block for the appropriate amount to be placed on their credit cards.
  iii. Provide a bank guarantee
  iv. Transfer funds to the account of the operator of the system from which the funds can be transferred to the business entity if the deal goes though.
b. (shown at step 2b) Express interest in getting due diligence conducted on the business proposal. At this stage investors do not specify the amount of funds they want to invest or the conditions under which they would invest. This expression of interest has no commitment associated with it.

For example at the end of this stage the commitments and expression of interest by investors could look like:

Investors who have committed funds unconditionally.

| Investor Identifier | Funds Committed |
|---|---|
| A | $10000 |
| B | $20000 |
| C | $5000 |
| D | $500 |
| E | $2500 |
| F | $5000 |
| G | $2000 |
| H | $15000 |
| Total | $60000 |

Investors who have expressed interest in getting due diligence conducted.

| Investor Identifier |
|---|
| M |
| N |
| O |
| P |
| Q |
| R |
| S |
| T |

In step 3, the process defined in step 2 above continues until the total amount of funds sought is committed through step 2a or the time period specified in the business proposal expires.

In step 4, if the total amount of funds sought is committed in step 2a then the business entity has to honor the proposal and the process of honoring the proposal is initiated. This is accomplished through fund-equity transfer engine 85.

In step 5, if the total amount of funds sought is not committed during the time period specified then the investors who have committed funds are given the option of backing out. This is necessary because the investors have committed to investing the funds with the view that the deal would be decided within the time period. They may not want their commitment to extend beyond that period. These investors also have the option of participating in the due diligence process.

In step 6 (FIG. 3b), if there are no investors interested in getting due diligence conducted (as tallied from step 2b) then this round of seeking funds terminates and the process enters the point where the business entity is given certain options to continue or terminate the process 100.

Continuing with FIG. 3*b*, in step 7, if there are investors interested in getting due diligence conducted then bids are invited from due diligence agencies registered with the system. The due diligence agencies study the business proposal and may contact the business entity whose proposal is under consideration to come up with a bid for conducting the due diligence. These bids are invited for a certain period of time. At the end of the period the bids received could look like:

| Due Diligence Agency Name | Bid Amount |
|---|---|
| ABC DD Agency | $1000 |
| DEF DD Agency | $2000 |
| GHI DD Agency | $5000 |

In step 8, once all the bids for conducting the due diligence have come in, investors who had expressed interest in getting due diligence conducted indicate the maximum amount they can contribute for a particular bid and the amount of funds they would commit to invest in the business proposal if the rating given by the DD agency is above a certain level.

A few of these conditional commitments could look like:

| Investor Identifier | DD Agency | Maximum Contribution | Funds committed conditionally | Condition(If rating given by DD Agency is at least) |
|---|---|---|---|---|
| M | ABC DD Agency | $20 | $1000 | 7 |
| N | ABC DD Agency | $30 | $2000 | 8 |
| M | GHI DD Agency | $100 | $10000 | 9 |
| P | DEF DD Agency | $10 | $500 | 6 |

Here the conditional commitment made by investor M is: she would invest $1000 in the business proposal if the Due Diligence gets conduction by ABC Agency and the rating given by ABC Agency to the business proposal is at least 7. For actually getting the Due Diligence conducted by ABC DD Agency she is willing to contribute up to $20.

Investor M also commits that if the due diligence gets conducted by GHI DD Agency and the agency gives a rating of at least 9 to the proposal then she would invest $10000. Also, she is willing to pay up to $100 to get the due diligence conducted by GHI Agency.

At step 9, the process of making conditional commitments continues till the time period specified for the conditional commitment expires. Investors may modify or withdraw their conditional commitments during this period. Steps 2-9 may be accomplished by an investor reply module 83.

Step 10 computes whether the investors can collectively meet one or more bids. This is accomplished by a fund equity transfer engine 85.

At step 11, in case investors cannot collectively meet any bid then the business entity is given the option of choosing to add funds so that one or more bids can be satisfied. If the business entity chooses not to add funds then the process 100 enters the point where the business entity is given certain options to continue or terminate the process 100.

At step 12, from the list of bids that can be fulfilled the combination of bids most likely to fulfill the amount of funds sought are chosen by fund-equity transfer engine 85. Note that in the general case more than one bid may be honored.

An investor may have indicated interest in getting due diligence conducted by more than one due diligence (DD) Agency but would pay for only one of them. If this investor becomes critical in deciding which of the two bids gets chosen then an expected value of the conditional funds committed against each bid is computed. And the one with the larger expected value is chosen. For example in the table in point 8 M has indicated getting the due diligence conducted by both ABC and GHI agencies. Suppose, which of the conditional commitments of M is chosen is the deciding factor in choosing whether the due diligence gets conducted by ABC or GHI then the expected value of both conditional commitments is computed.

Expected Value=(Amount of funds in conditional Commitment)*(Probability that the Conditional Commitment gets fulfilled)

The probability of the conditional commitment being fulfilled is computed on the basis of how high a rating is desired (the higher the rating the lesser the probability) and the rating given by the due diligence agency if the business entity had got due diligence conducted on its proposal. Statistical results from previous business proposals can also be used to compute the probability of the conditional commitment being fulfilled.

There can be several metrics employed to choose the combination of bids by due diligence agencies that will be asked to conduct the due diligence. If there is no such combination which in the best case would fulfill the total amount of funds sought then the process 100 (e.g., fund-equity transfer engine 85) enters the point where the business entity is given certain options to continue or terminate the process.

The best case is defined as the case in which the rating given by the DD Agency is at least the maximum rating desired by any investor who has indicated interest in the given bid.

At step 13, the funds are pooled in from the investors and the business entity (if applicable) and due diligence contracts are awarded to the all the due diligence agencies that are chosen in step 12 above. Due diligence gets conducted by all these due diligence agencies.

Turning now to FIG. 3*c*, at step 14, after the ratings are available from all due diligence agencies conditional commitments for which the conditions are fulfilled are chosen by the fund-equity transfer engine 85. In case these fulfilled conditional commitments exceed the amount remaining in the funds sought by the business proposal preference is given to those who had made the conditional commitment at an earlier date. Also, partial allotment may be done to fulfill the exact amount of funds sought.

At step 15, if the unconditionally committed funds combined with the conditional commitments for which the conditions have been met can meet a certain predefined percentage of the funds sought then the business entity must honor the proposal.

In steps 16*a* through 16*c* (including steps 16*b*' and 16*c*'), the business entity otherwise has the following options:
 a. Honor the original proposal (fund-equity transfer engine 85 processes the transfer accordingly).
 b. Extend the time period and make it open to all the investors (through business proposal module 81). When the time period is extended the investors who have committed have the option to back out as they may not want their commitment to hold on indefinitely. This is accomplished through investor reply module 83.

c. Revise the proposal (through business proposal module 81) and re-present to the investors who had already committed giving them a specific time period in which to accept the proposal (through investor reply module 83) i.e. commit to the revised business plan and revised rate for equity. If the total amount of funds so committed is no less than a certain percentage of funds sought in the revised plan the business entity must honor the revised proposal. Otherwise the business entity can choose to extend or revise and go through any number of iterations.

Or, the business entity can withdraw the proposal.

In step 17, the process of honoring the business proposal begins which culminates in the funds being transferred to the business entity and equity being transferred to the investors via transfer engine 85.

Figure 4:
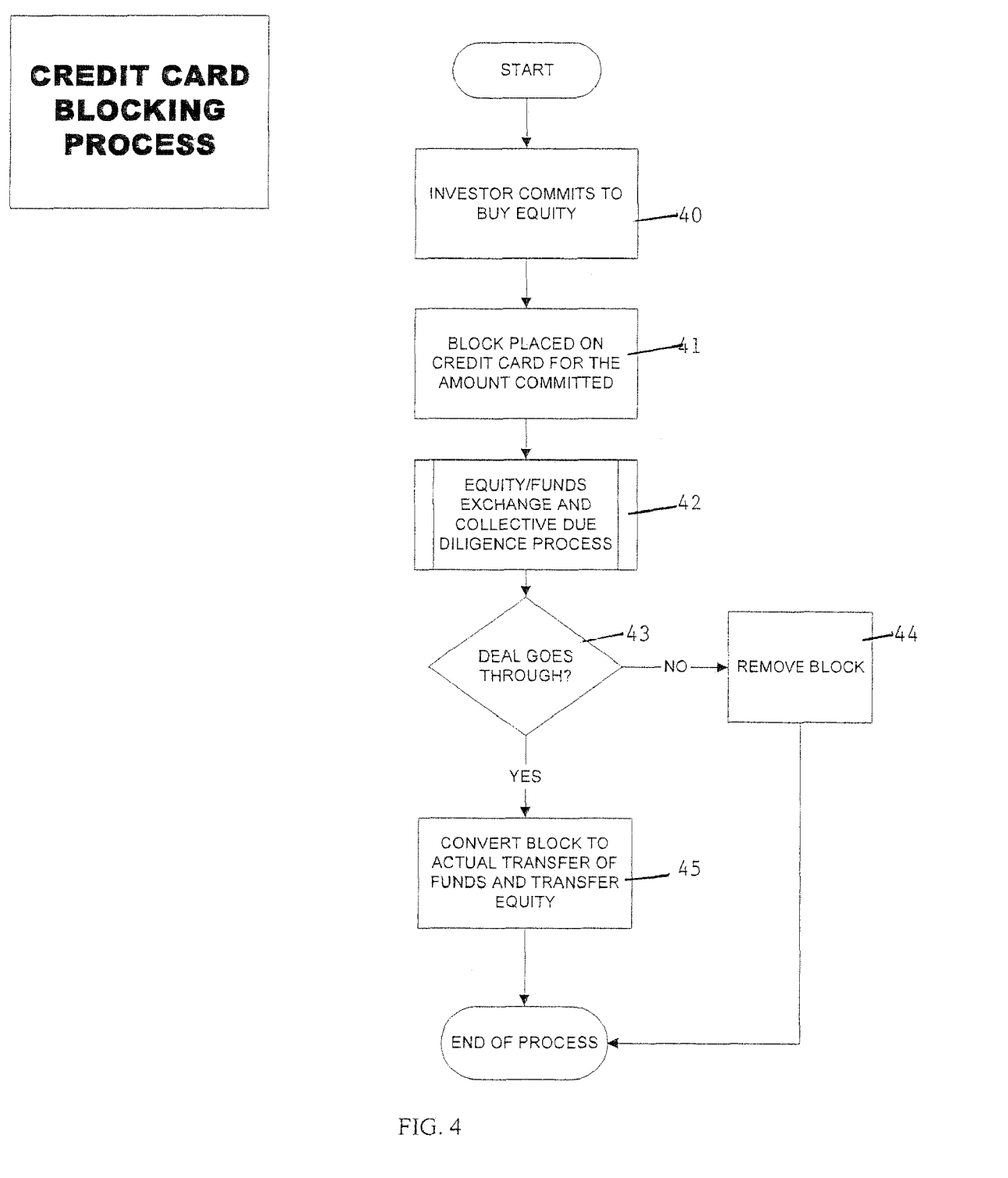
FIG. 4 is a flow diagram of a credit blocking process in an embodiment of the present invention.

With reference to FIG. 4, there is a process 47 for enforcing the commitment of investors to buy certain amount of the equity at the rate fixed in the process 100 above. When an investor commits 40 certain funds to buy equity for a particular proposal, a block is placed 41 for that amount of funds on his or her credit card, wire transfer, online payment (e.g., via third party global computer network site), or similar finance source. This block 41 remains in effect until a final decision on whether or not to execute the transaction is reached (at 42). Once the conditions for the acceptance or rejection of a transaction are fulfilled then the block is converted 45 to an actual transfer of funds if the transaction goes through 43, otherwise the block is removed 44.

In case there is an additional charge associated with keeping the block on the credit card for more than a given time period, the charge would be born by the investor and/or the subject business entity based on pre-agreed terms and conditions.

Other embodiments may employ variations of the foregoing features and design of process 100. For example, in one embodiment there is an incentive for investors to commit more money towards getting due diligence conducted. This could be in form of (but not limited to):

a) Preferential equity allotment. In case process 100 has to distribute equity to a large number of investors and partial allotment needs to be done, one factor could be the amount of money the particular investor put towards due diligence. There could be other factors too like time—first come first served basis.

b) This may be one of the parameters for individual investor rating (more on ratings later). Investors would like to have high ratings.

c) Other possible incentives.

Assigning ratings to Due Diligence Agencies, Investors, and Business Entities may be based on feedback from other persons involved or other metrics like failing to keep a promise, or in case of due diligence agencies their performance and accuracy of their due diligence ratings. For example, a due diligence agency might give a business and index of 7 but the realistic index is only 5. System 100 notes this level of accuracy/inaccuracy on the part of the due diligence agency.

In another embodiment, one may elect to enter into a modified process where the investors commit money for getting due diligence conducted but in a general pool (and not towards a particular due diligence agency's bid). The due diligence agencies do not see this amount and enter their bids later or separately. The first one to satisfy the total amount pooled gets the bid. Investors can also place additional restriction on this 'blind' bidding so that only due diligence agencies with certain ratings qualify to get the bid.

In yet another embodiment, the business entity can optionally make their business plan public or restricted (for fear of competition getting to know their business plans). The restrictions could be:

a) Business plan is only visible to investors with ratings higher than set by the business entity (to ensure/maximize that competition does not register itself as new user and see the plan). Seasoned investors with good track records can be trusted.

b) The plan is multi-level—an abstract version visible to people with less ratings and full plan available to investors with high ratings.

c) Only an abstract or summary posted. For a view of the detailed business plan, investors need to contact the business entity where the business entity can release the full plan to them after verifying the investor's credentials.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network and architecture of FIGS. 1 and 2 are for purposes of illustration and not limitation of the present invention.

Equity may be replaced by or combined with other commercial instruments like property which can be traded/divided.

The focus of the present invention is not to set up primary/secondary markets but to develop a system for removing the hurdles in the path of relatively small fund seekers and retail investors to work out an effective collaboration. The following points specify some of the things that the current invention can do which the prior art can't.

If a fund seeker posts a business proposal seeking a certain amount of funds the fund seeker may want to withdraw the proposal if a certain percentage of the funds are not committed by investors because the fund seeker won't be able to go ahead with the business plan, and thus may not want to divest any equity. Putting out private equity shares for sale in any kind of market in the prior art does not give the fund seeker an option to withdraw the proposal in case a certain number of shares are not sold.

In case the fund seeker is not able to raise the required amount of funds this invention gives the fund seeker and the investors who have committed funds to enter into another process in which these investors are given the first priority in rejecting or accepting the revised business proposal.

What is claimed is:

1. An equity financing system, comprising:
one or more computer processors configured to publish a business proposal by a subject entity in a portal accessible by multiple investors and multiple third party due diligence providing agencies, the portal centrally publishing the business proposal to the multiple investors and to the multiple third party due diligence providing agencies, wherein the business proposal is independently reviewed by said multiple third party due diligence providing agencies and said multiple investors, the published business proposal indicating (a) an amount of funds requested by the subject entity in exchange for equity in the subject entity, and (b) an advertised conversion rate at which funds are converted to equity;

an investor reply module enabling each investor to see third party due diligence providing agency bids submitted for conducting due diligence and to responsively make a conditional commitment, an unconditional commitment or a combination thereof, wherein each conditional commitment includes an amount of funds committed by an investor conditioned on (i) a due diligence being conducted by a certain third party due diligence providing agency selected by the investor and (ii) the due diligence resulting in a rating meeting a threshold defined by the investor, and the conditional commitment includes a maximum amount of funds which the investor is willing to individually contribute to finance the due diligence, and wherein each unconditional commitment includes an amount of funds committed by the investor to purchase a specific percentage of equity at the advertised conversion rate; and a fund-equity transfer engine responsive to execute investor commitments collected through the investor reply module, wherein the fund-equity transfer engine determines whether a total of the collected investor commitments meets or exceeds a percentage of the amount of funds requested, awards due diligence contracts to each of the third party due diligence providing agencies according to the respective investor commitments, and processes a transfer of investors funds in exchange for the subject entity equity according to respective investor commitments and the business proposal.

2. A computer system as claimed in claim 1, wherein the fund-equity transfer engine determines a best fit of conditional commitments to the business proposal.

3. A computer system as claimed in claim 1, wherein a conditional commitment is further conditioned on an investor defined percentage of the requested funds being committed to by other investors.

4. A computer system as claimed in claim 1, wherein an investor may make multiple conditional commitments for the business proposal.

5. A computer system as claimed in claim 1, wherein the portal provides publishing of business proposals of multiple entities in one or more views, different views having different levels of detail.

6. A computer system as claimed in claim 1, wherein the fund-equity transfer engine allows the subject entity to withdraw the business proposal if the percentage of amount of funds requested is not met by the total collected investor commitments.

7. A computer system as claimed in claim 1, further comprising a block placed on investor funds to enforce investor commitments.

8. A computer system as claimed in claim 1, wherein subject entity equity includes any combination of equity, commercial paper and real property.

9. A computer implemented method for providing equity financing, comprising the steps of:

publishing by a computer, to a portal, a business proposal by a subject entity, the portal being accessible by multiple investors and multiple third party due diligence providing agencies, wherein the published business proposal includes (a) an indication of amount of funds being requested by the subject entity in exchange for equity in the subject entity and (b) an advertised conversion rate at which funds are converted to equity, and the published business proposal being independently viewed by the multiple investors and the multiple third party due diligence providing agencies;

collecting, by the computer, bids from third party due diligence providing agencies for conducting due diligence on the published business proposal, the collected bids being viewable by the multiple investors;

collecting, by the computer, commitments from investors including a conditional commitment, an unconditional commitment or combinations thereof wherein each conditional commitment includes an amount of funds committed by an investor conditioned on (i) due diligence being conducted by a certain third party due diligence providing agency selected by the investor and (ii) the due diligence resulting in a rating meeting a threshold defined by the investor, and the conditional commitment includes a maximum amount of funds that the investor is willing to individually contribute to finance the due diligence, and wherein each unconditional commitment includes an amount of funds committed by the investor to purchase a specific percentage of equity at the advertised conversion rates; and determining, by the computer, whether a total of collected commitments meets or exceeds a percentage of the amount of requested funds;

awarding due diligence contracts to each of the third party due diligence providing agencies according to the respective investor commitments; and processing a transfer of investor funds in exchange for the subject entity equity accordingly.

10. A method as claimed in claim 9, wherein the step of determining employs a best fit determination.

11. A method as claimed in claim 9 wherein a conditional commitment is further conditioned on an investor defined percentage of the requested funds being committed to by other investors.

12. A method as claimed in claim 9, wherein an investor may make multiple conditional commitments for the business proposal.

13. A method system as claimed in claim 9, wherein the step of publishing includes providing business proposals by different entities in one or more views, different views having different levels of restriction or detail.

14. A method as claimed in claim 9 further comprising the step of enabling the subject entity to withdraw the business proposal if the percentage of amount of funds requested is not met by the total collected investor commitments.

15. A method as claimed in claim 9, wherein the step of collecting commitments includes enforcing commitments from investors by placing a block on investor funds.

16. A method as claimed in claim 9, wherein subject entity equity includes any combination of business equity, commercial paper and real property.

17. An apparatus in a computer network comprising:

means for publishing a business proposal, the publishing means being configured to, upon execution by a processor, publish a business proposal by a subject entity in a portal accessible by multiple investors and multiple third party due diligence providing agencies, wherein the published business proposal includes an indication of (a) an amount of funds requested by the subject entity in exchange for equity in the subject entity, and (b) an advertised conversion rate at which funds are converted to equity, and the published business proposal being viewed independently by the multiple investors and the multiple third party due diligence providing agencies;

means for replying to a published business proposal, said reply means being executed by the processor and enabling at least investors to respond to business proposals published through the publishing means, the reply means enabling investors to see third party due diligence providing agency bids submitted for conducting due diligence on published business proposals, investor responses including a conditional commitment, an unconditional commitment, or a combination thereof wherein each conditional commitment includes an amount of funds committed by an investor conditioned on (i) due diligence being conducted by a certain third party due diligence providing agency as selected by the investor and (ii) the due diligence resulting in a rating meeting an investor defined threshold, and the conditional commitment includes a maximum amount of funds that the investor is willing to individually contribute to finance the due diligence, and wherein each unconditional commitment includes an amount of funds committed by the investor to purchase a specific percentage of equity at the advertised conversion rate; and means for transferring funds for equity, said fund-equity transfer means being executed by the processor and collecting commitments from investor responses through the reply means, wherein the fund-equity transfer means determines whether a total of collected commitments meets or exceeds a percentage of the requested funds, awards due diligence contracts to each of the third party due diligence providing agencies according to the respective investor commitments and provides transfer of investor funds committed in exchange for subject entity equity accordingly.

18. Computer apparatus as claimed in claim 17, wherein the fund-equity transfer means allows the subject entity to withdraw the business proposal if the percentage of funds requested is not met by the total collected investor commitments.

19. A computer apparatus as claimed in claim 17, wherein the fund-equity transfer means further includes means for enforcing investor commitments by blocking investor funds.

20. A computer apparatus as claimed in claim 17, wherein the publishing means enables one or more views of the business proposal, different views providing different levels of restricted publishing of the business proposal.

21. A computer apparatus as claimed in claim 17, wherein the subject entity equity includes any combination of business equity, commercial paper and real property.

22. A computer apparatus as claimed in claim 17, wherein the reply means enables blind bidding by due diligence agencies where investors commit to a general pool of funds for having due diligence conducted.

* * * * *